(12) United States Patent
Faroudja et al.

(10) Patent No.: US 9,049,448 B2
(45) Date of Patent: Jun. 2, 2015

(54) BIDIMENSIONAL BIT-RATE REDUCTION PROCESSING

(71) Applicant: FAROUDJA ENTERPRISES INC., Los Altos, CA (US)

(72) Inventors: Yves Faroudja, Los Altos Hills, CA (US); Xu Dong, San Jose, CA (US)

(73) Assignee: FAROUDJA ENTERPRISES, INC., Los Altos, CA (US)

( * ) Notice: Subject to any disclaimer, the term of this patent is extended or adjusted under 35 U.S.C. 154(b) by 0 days.

(21) Appl. No.: 14/212,482

(22) Filed: Mar. 14, 2014

(65) Prior Publication Data

US 2014/0219367 A1 Aug. 7, 2014

Related U.S. Application Data

(63) Continuation-in-part of application No. 13/860,635, filed on Apr. 11, 2013, now Pat. No. 8,855,214.

(60) Provisional application No. 61/902,116, filed on Nov. 8, 2013, provisional application No. 61/760,277, filed on Feb. 4, 2013, provisional application No. 61/765,891, filed on Feb. 18, 2013.

(51) Int. Cl.
| | |
|---|---|
| *H04N 19/33* | (2014.01) |
| *H04N 19/00* | (2014.01) |
| *H04N 19/80* | (2014.01) |
| *H04N 19/85* | (2014.01) |
| *H04N 19/59* | (2014.01) |

(52) U.S. Cl.
CPC ............. *H04N 19/33* (2014.11); *H04N 7/26* (2013.01); *H04N 19/80* (2014.11); *H04N 19/85* (2014.11); *H04N 19/59* (2014.11)

(58) Field of Classification Search
USPC ..................................... 375/240.01–240.29
See application file for complete search history.

(56) References Cited

U.S. PATENT DOCUMENTS

| 5,835,147 A | * | 11/1998 | Florentin et al. | ......... 375/240.12 |
| 6,133,957 A | | 10/2000 | Campbell | |
| 7,020,195 B1 | * | 3/2006 | McMahon | ............... 375/240.11 |
| 2010/0226427 A1 | * | 9/2010 | Jung et al. | ................ 375/240.01 |

FOREIGN PATENT DOCUMENTS

JP 2002150281 A * 5/2002 ................ G06T 3/40

OTHER PUBLICATIONS

U.S. Appl. No. 14/211,932, filed Mar. 14, 2014 entitled, "Combiner Processing System and Method for Support Layer Processing in a Bit Rate Reduction System".

* cited by examiner

*Primary Examiner* — Dave Czekaj
*Assistant Examiner* — Shanka Brumfield
(74) *Attorney, Agent, or Firm* — Convergent Law Group LLP (57) ABSTRACT

Methods and systems for bidimensional video processing comprise preprocessing the video signal in horizontal and vertical dimensions of the video signal to reduce an amount of information of the video signal by low pass filtering the video signal and removing pixels to obtain an information-reduced video signal; expanding the information-reduced video signal by an expander process to produce an upconverted video signal; and comparing the upconverted video signal to the original video input to generate a support signal based on a difference between the original video signal and the upconverted video signal. Further embodiments include at least one of storing and transmitting the information-reduced video signal and the support signal; and during post-processing, processing and combining the information-reduced video signal and the support signal to generate a full information duplicate of the video signal.

21 Claims, 5 Drawing Sheets

BIDIMENSIONAL BIT-RATE REDUCTION PROCESSING

CROSS-REFERENCE TO RELATED APPLICATIONS

This application claims the benefit of U.S. Provisional Application Ser. No. 61/902,116 filed Nov. 8, 2013, and is a Continuation-in-Part of patent application Ser. No. 13/860,635, filed Apr. 11, 2013, which claims the benefit of provisional Patent Application Ser. No. 61/760,277, filed Feb. 4, 2013, and provisional Patent Application Ser. No. 61/765,891, filed Feb. 18, 2013.

This application is further related to U.S. patent application Ser. No. 14/211,932, filed on a date even herewith entitled "Combiner Processing System and Method for Support Layer Processing in a Bit-Rate Reduction System," All the above application are incorporated herein by reference.

BACKGROUND

Video signals are requiring a high amount of bandwidth to be transmitted and recorded, more particularly with digital transmission schemes. Most of the bandwidth and memory requirements, in the internet, are dedicated to video, and as a result, frequent limitations or losses of image quality appear.

Digital compression systems require a high bit count (equivalent to large bandwidth) to process a scan video signal with an acceptable quality. The requirements for bandwidth are increasing daily, and the available bandwidth provided by present communication channels is limited. For example, more than 50% of Internet traffic is occupied by video.

Broadcasters are no longer satisfied with present HDTV standards (1080i and 720p) and would like to move to higher scan rates (e.g., "4K", which is approximately 2000×4000 pixels) or higher frame rates (120 Hz). Furthermore, interlace standards, which in the past employed analog transmission, reduced the bandwidth requirements by two at the cost of image quality (artifacts). Interlacing does not present such an advantage in compression systems, and is not computer-friendly.

Thus, increased bandwidth is required. As an alternative, a more efficient use of the existing bandwidth is preferable.

Compression standards are slowly improving, getting more efficient in packing an increasing data load into increasingly over-worked channels, but an improvement by a ratio of two in the bandwidth utilization (Mb/s for a constant channel) occurs only every eight to ten years or so.

Furthermore, conventional video compression systems tend to focus on mathematical comparisons of video inputs and video outputs before and after compression, rather than focusing on the visible quality of the video data in bit-rate reduction attempts. Consequently, conventional video compression systems are not typically optimized for retaining visible video quality of the video data relative to bit-rate reductions.

A need has arisen, therefore, to reduce the bandwidth, or Mbits/sec, of digitally compressed video signals, while maintaining a reasonable image quality after decoding.

BRIEF SUMMARY

Exemplary embodiments provide methods and systems for bidimensional video processing comprising: preprocessing the video signal in horizontal and vertical dimensions of the video signal to reduce an amount of information of the video signal by low pass filtering the video signal and removing pixels to obtain an information-reduced video signal; expanding the information-reduced video signal by an expander process, for example, to produce an upconverted video signal; and comparing the upconverted video signal to the original video input to generate a support signal based on a difference between the original video signal and the upconverted video signal. Further embodiments include at least one of storing and transmitting the information-reduced video signal and the support signal; and during post-processing, expanding the information-reduced video signal to generate an upconverted video signal, and combining the upconverted video signal and the support signal to generate a full information duplicate of the video signal.

Exemplary embodiments further provide a method for bidimensional post-processing comprising: receiving an information-reduced video signal and a support signal, the information-reduced video signal having been generated by a preprocessor that processed a video signal horizontal and vertical dimensions of the video signal to reduce an amount of information of the video signal by low pass filtering the video signal and removing pixels to obtain the information-reduced video signal; expanding, by an expander, the information-reduced video signal to generate an upconverted video signal; enhancing, by a bidimensional enhancer, the upconverted video signal to generate an enhancement signal; combining, by a combiner processor, the upconverted video signal with the support signal to generate a full bandwidth video signal; and adding the enhancement signal in the full bandwidth video signal to generate a full information duplicate video signal.

DETAILED DESCRIPTION

The exemplary embodiments relate to bidimensional video processing. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components that those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Definitions

As used herein, the term "video signal" refers to an electrical signal designed to produce an image on an electronic device. The video signal comprises a series of horizontal rows or scan lines of pixels. The video signal may represent an interlaced video signal or a progressive scan video signal.

The term "information-reduced video signal" refers to a main path of the video signal after processing by a preprocessor that includes a horizontal low-pass filter, a vertical low-pass filter, a horizontal pixel count reduction block, and a vertical pixel count reduction block to reduce bit-rates in a main portion of the video signal. The information-reduced video signal transmits low-frequency signals after the low-pass filtering.

The term "support signal" refers to a support path derived from the information-reduced video signal during processing by the preprocessor. In an exemplary embodiment, the support signal transmits high-frequency signal details while also providing additional bit-rate reductions, so that a postprocessor may process and combine the support signal with the information-reduced video signal video signal to recover and/or generate details necessary for high-quality image and video reconstruction.

In the following description, numerous specific details are set forth to provide a more thorough understanding of the present embodiments. However, it will be apparent to one of skill in the art that the present embodiments may be practiced without one or more of these specific details. In other instances, well-known features and procedures well known to those skilled in the art have not been described in order to avoid obscuring the embodiments.

Prior art methods for reducing bandwidth of video signal primarily focus on performing the requisite mathematics correctly. Once the video signal is compressed and transmitted to a receiver, the compressed signal is decompressed to generate a restored signal. Conventional typically methods focus on how similar the restored signal is to the originals video signal.

The exemplary embodiments optimize bit-rate reductions of a video signal based on retention of the visual perception of image quality of the video data, instead of mere mathematical input-output comparisons of the video data to the restored video signal. The exemplary embodiments provide methods and systems for bit-rate reduction of a video signal by separating the video signal into a main layer comprising an information-reduced video signal, and a support layer comprising a support signal derived from the information-reduced video signal. According to the exemplary embodiments, both the information-reduced video signal and the support signal are bit-rate reduced prior to storage or transmission. After storage or transmission, the information-reduced video signal and the support signal are post-processed and combined to produce a faithful reproduction of the original video signal that retains high visible image quality.

Figure 1:
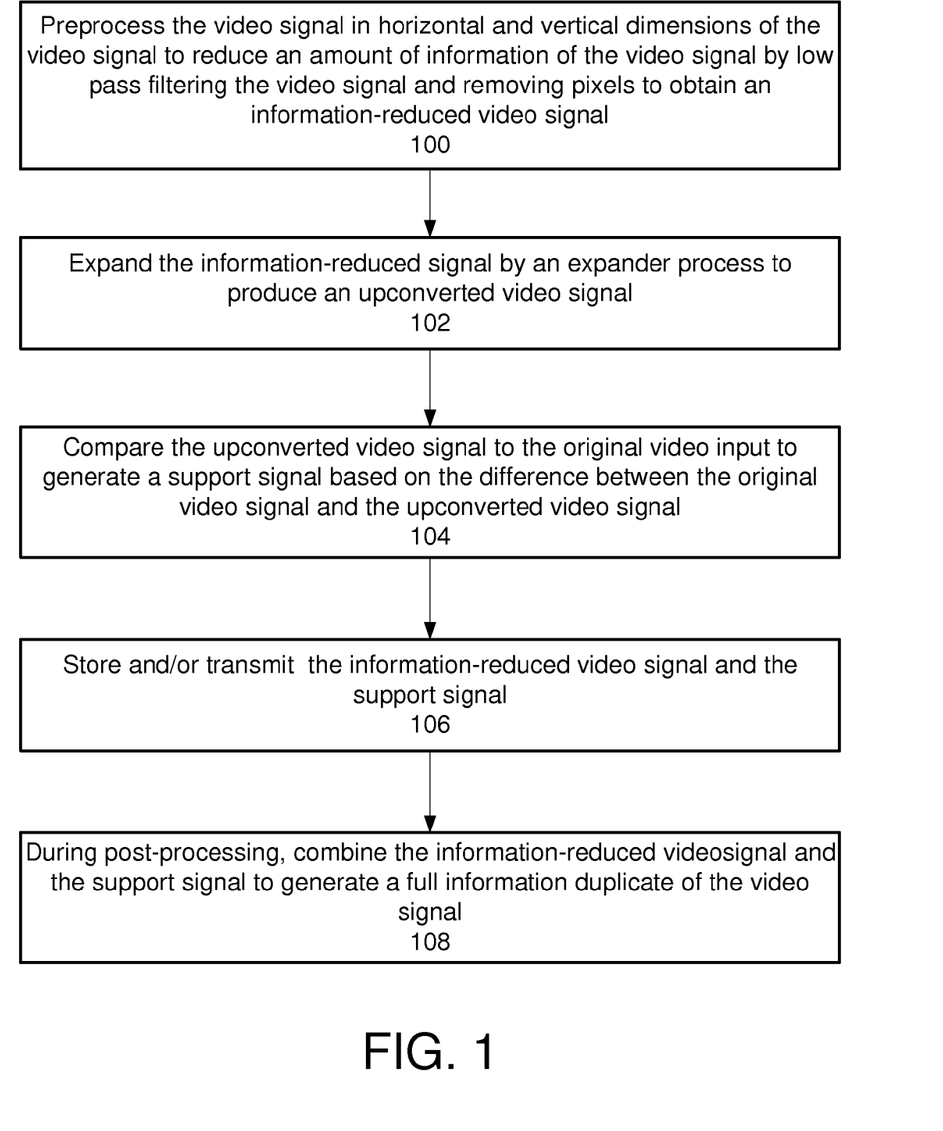
FIG. 1 is a flow diagram illustrating a process for bidimensional video processing in order to reduce bandwidth requirements for storage and/or transmission of a video signal.

FIG. 1 is a flow diagram illustrating a process for bidimensional video processing in order to reduce bandwidth requirements for storage and/or transmission of a video signal. The process may begin by preprocessing the video signal in horizontal and vertical dimensions of the video signal to reduce an amount of information of the video signal by low pass filtering the video signal and removing pixels to obtain an information-reduced video signal (block 100). This reduction may be obtained by horizontal and vertical low-pas filtering of the video signal, and elimination of pixels made redundant by the low pass filtering process. The video signal may be either an interlaced or progressive signal.

The information-reduced video signal is then expanded through an expander process to produce an upconverted information-reduced video signal (block 102). In one embodiment, the expander process may comprise a diagonal interpolation.

The upconverted information-reduced video signal is compared to the original video input to generate a support signal based on a difference between the original video signal and the upconverted information-reduced video signal (block 104). The information-reduced video signal and the support signal may further be separately compressed for further bandwidth reduction in one embodiment.

The information-reduced video signal and the support signal may then be stored in a storage medium and/or transmitted (block 106). Because the information-reduced video signal contains less overall information (e.g., pixels) than the original video signal and the support signal contains only differences between the upconverted information-reduced video signal and the original video signal, the process conserves information required to store and/or transmit the full information of the original video signal.

During post-processing, the information-reduced video signal and the support signal are processed and combined to generate a full information duplicate of the video signal (block 108).

Figure 2A:
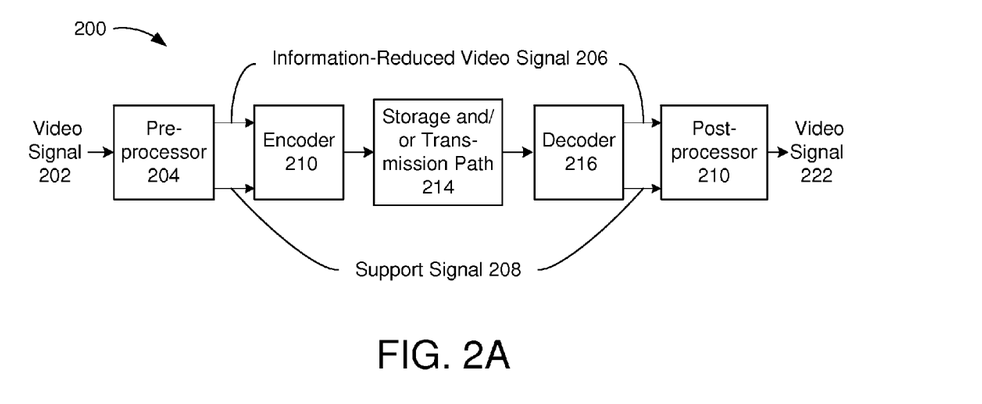
FIGS. 2A and 2B are block diagrams illustrating different embodiments of a bidimensional video processing system for implementing the process of FIG. 1.
Figure 2B:
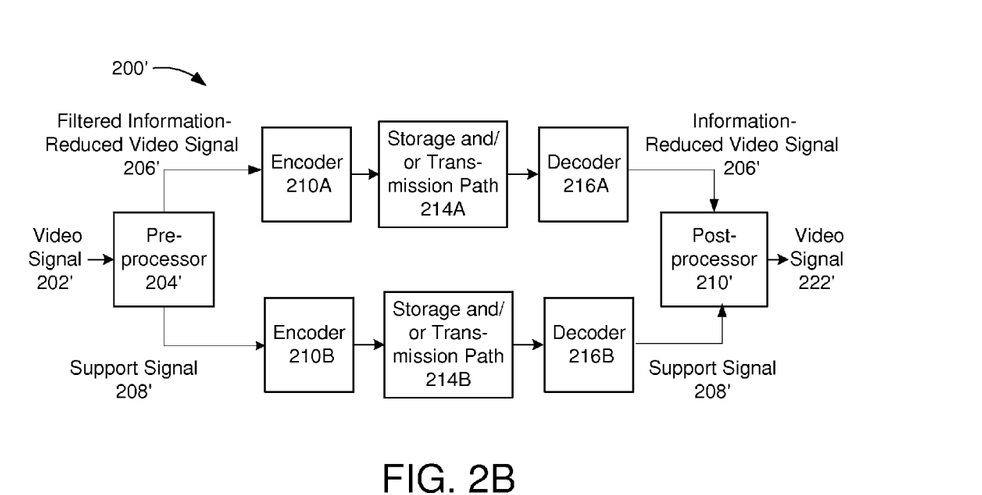

FIGS. 2A and 2B are block diagrams illustrating different embodiments of a bidimensional video processing system for implementing the process of FIG. 1. FIG. 2A shows that one exemplary embodiment of the bidimensional video processing system 200 may include a preprocessor 204, an encoder 210, a storage and/or transmission path 214, a decoder 216, and a postprocessor 210. The preprocessor 204 performs bidimensional video processing on a video signal 202 to reduce the amount of information, such as pixels, to be stored and/or transmitted. In one embodiment, the preprocessor 204 may be coupled to a memory (not shown) to facilitate the storage and/or transmission. The postprocessor 210 processes the stored and/or transmitted information after reception to create a duplicate video signal 222.

In operation, the preprocessor 204 receives a video signal 202 and generates the information-reduced video signal 206. In one embodiment, the video signal 202 may be preprocessed by performing any combination of horizontal and vertical filtering on the video signal 202, followed by any combination of horizontal and vertical pixel count reduction.

For example, the filtered information-reduced video signal 206 may be generated by performing in series: 1) horizontally low-pass filtering the video signal, for example, at ½ the upper bandwidth limit of the signal, eliminating 1 pixel out of 2; and 2) vertically low-pass filtering the video signal, for example by eliminating 1 line out of 2.

The preprocessor 204 then generates the single support signal 208 based on a difference between the horizontally and vertically information-reduced video signal and the original video signal, as explained further below.

The preprocessor 204 passes the information-reduced video signal 206 and the support signal 208 to the encoder 210 for encoding. The resulting encoded information-reduced video signal and the support signal are then sent to a storage and/or transmission path 214.

After access and/or reception from the storage and/or transmission path 214, the encoded filtered information-reduced video signal and the support signal are decoded by the decoder 216 to reproduce the information-reduced video signal 206 and the support signal 208.

The postprocessor 210 receives the information-reduced video signal 206 and the support signal 208. The postprocessor 210 combines the information-reduced video signal 206 and the support signal 208 to generate a full information duplicate copy of the original video signal 222, as described further below.

FIG. 2B shows an alternative embodiment of a bidimensional video processing system 200'. The bidimensional video processing system 200' includes the same components as shown in the embodiment of FIG. 2A, but includes separate paths for the information-reduced video signal 206' and the support signal 208' between the preprocessor 204' and the postprocessor 210'. The information-reduced video signal 206 is sent through encoder 210A, storage and/or transmission path 214A, and decoder 216A. The support signal 208' is sent through encoder 210B, storage and/or transmission path 214B, and decoder 216B.

Figure 3A:
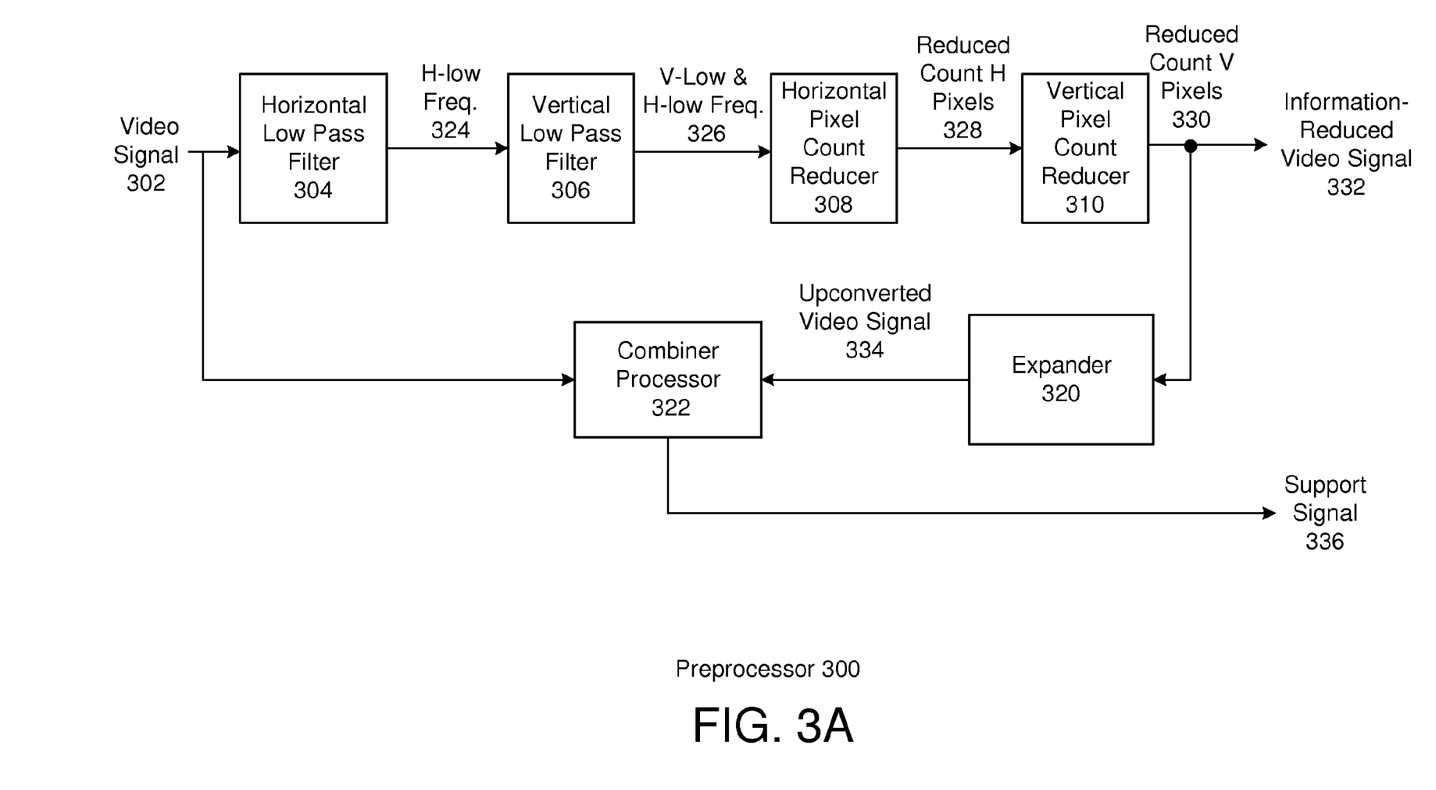
FIGS. 3A and 3B are diagrams of embodiments of a preprocessor that performs bidimensional video processing in the horizontal and vertical domains in serial along with expansion.
Figure 3B:
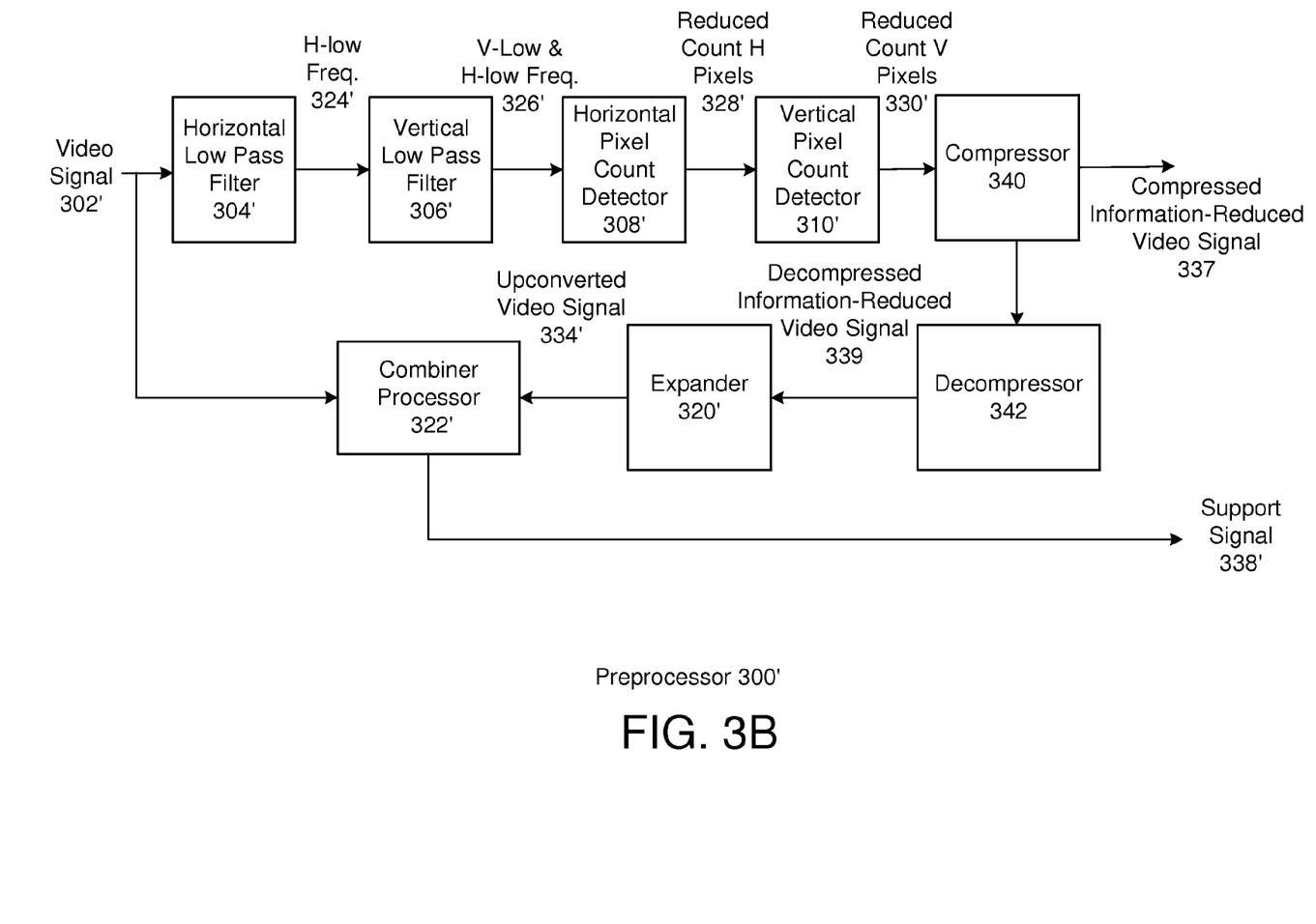

FIGS. 3A and 3B are diagrams of embodiments of a preprocessor that performs bidimensional video processing in the horizontal and vertical domains in serial along with expansion. The bidimensional video processing performed by the preprocessor 300 reduces the amount of information of an input video signal 302 and outputs an information-reduced video signal 332 and a corresponding support signal 334 derived from the information-reduced video signal 332.

Although in the embodiment shown, a single support signal 334 is output by the preprocessor 300, in an alternative embodiment, two or more support signals may be generated in output corresponding to the horizontal and vertical domains of the video signal 302.

In the embodiment shown, the preprocessor 300 may comprise a horizontal low pass filter 304, a vertical low pass filter 306, a horizontal pixel count reducer 308, a vertical pixel count reducer 310, an expander 320, and a combiner processor 322. The horizontal low pass filter 304 and the vertical low pass filter 306 filter out and/or reduce the high-frequency portion of the video signal 3024 bit-rate reduction in the main layer processing pathway.

The horizontal low pass filter 304 reduces bandwidth of the video signal 302 in a horizontal domain in order to subsequently reduce the pixel count in a way that respects the Nyquist criterion so there will be reduced artifacts. In one embodiment, the horizontal low pass filter 304 comprises a separator that horizontally low-pass filters the video signal, for example, at ½ the upper bandwidth limit of the signal. The output of the horizontal low pass filter 304 comprises horizontal-low frequencies 324 of the information-reduced video signal.

The vertical low pass filter 306 receives the horizontal-low frequencies 324 from the horizontal low pass filter 304 and reduces bandwidth of the video signal in a vertical domain. In one embodiment, the vertical low pass filter 306 vertically low-pass filters the video signal 302. The output of the vertical low pass filter 306 comprises vertical-low and horizontal-low frequencies 326 of the information-reduced video signal.

The positions of the horizontal low pass filter 304 and the vertical low pass filter 306 may occur in any order followed by the horizontal pixel count detector 308 and the vertical pixel count detector 310, which may also occur in any order.

The horizontal pixel reducer 308 receives the vertical-low and horizontal-low frequencies 326 and reduces the pixel count in the horizontal domain, for example, by eliminating 1 pixel out of 2 sequentially aligned on a horizontal line (e.g., reducing the number of horizontal pixels by a ratio of two). This process may eliminate pixels made redundant by the horizontal filtering process. The output generated by the horizontal pixel reducer 308 comprises a reduced-count horizontal pixel signal 328 that has been horizontally and vertically low pass filtered.

The vertical pixel reducer 310 receives the reduced horizontal pixels 328 and reduces the pixel count in the vertical domain, for example, by eliminating 1 pixel out of 2 sequentially aligned on a vertical line, to produce a reduced count vertical pixel signal 330 that has been horizontally and vertically low pass filtered as well as reduced horizontal pixels. This process eliminates pixels made redundant by the vertical filtering process. The output of the vertical pixel count detector 310 comprises the information-reduced video signal 332 that has less information than the original video signal 302.

According to one aspect of exemplary embodiment, the preprocessor 300 reduces the pixel count of the video signal 302 (also referred to as decimation) in agreement with Nyquist criterion. Every time each dimension the pixel count is reduced, there is decimation, which is at a lower frequency, and unless the signal is low pass filtered in agreement with the decimation (the number of pixels reduced), there will be artifacts. That is, the process will not produce artifacts if the video signal is low pass filtered and pixel reduced using the same ratio, both horizontally and vertically. For example, if the bandwidth of the video signal 302 is 1, and the horizontal low pass filter 306 has cutoff of ½ the limit of the bandwidth of the video signal, then the reduction in horizontal pixel count should have ratio of 1 to 2 to be consistent. Similarly, if the vertical pixel count reducer 310 reduces the number of vertical pixels by ratio of 2, it is necessary to configure the vertical low pass filter 306 in the same ratio.

The information-reduced video signal 332 is input to the expander 320, which expands or upconverts the information-reduced video signal 332. The upconverted video signal 334 produced by the expander 320 has the same pixel count horizontally and vertically, and the same frequency response as the original video signal 302. With normal horizontal and vertical only interpolation, any diagonal transitions in the resulting signal may appear step like. According to the exemplary embodiment diagonal interpolation is performed to significantly reduce step like diagonal transitions.

The expander 320 enhances resolution of images represented in the information-reduced video signal 332 by interpolating pixels that have been previously eliminated from the video signal 302 by blocks 304, 306, 308 and 310 using an adaptive process that determines whether the interpolation should be done vertically or diagonally.

In one embodiment, the expander 320 performs bidimensional diagonal interpolation process to generate an upconverted video signal 334. A detailed discussion of the diagonal interpolation processes outside scope of this document, however in summary, an additional pixel is generated at a location in an image comprising pixels arranged in rows by generating a plurality of measurement signals representing respective directions and respective measures of variance between pairs of sets of pixels in the respective directions relative to the location, evaluating respective directions represented by the measurement signals to identify the two best directions for interpolation and selecting therefrom a single best choice direction for interpolation, evaluating the two best directions and, in response thereto, generating a first control signal indicating a measure of ambiguity for interpolation about the location along the single best choice direction, generating a direction control signal representing a weighted combination of the single best choice direction and another direction that is substantially orthogonal to the rows, the weighted combination formed according to the first control signal, and generating the additional pixel by interpolating pixels in the image along a direction represented by the direction control signal. In another embodiment, a second control signal is generated indicating a measure of confidence in the single best choice direction and the weighted combination is formed according to the first control signal and the second control signal. For further details regarding the operation of a bidimensional diagonal interpolator, see U.S. Pat. No. 6,133,957 issued Oct. 17, 2000, entitled "Adaptive Diagonal Interpolation for Image Resolution Enhancement," incorporated herein by reference for all purposes.

The upconverted video signal 334 output by the expander 320 is substantially similar to the original video signal 302, but not an exact copy and may still contain visible errors/artifacts.

Therefore, according to another aspect of the exemplary embodiments, the combiner processor 322 is utilized to further process the upconverted video signal 334 produce the support signal 336 that can be used by the postprocessor to faithfully reproduce the original video signal 302.

The combiner processor 322 receives and compares the video signal 302 and the upconverted video signal 334 to generate the support signal 336 based on the difference between the video signal 302 and the upconverted video signal 334. The upconverted video signal 334 generally does not contain all the information of the original video signal 302, but the combiner processor 322 uses the differences between the original video input signal 302 and the upconverted video signal 334 to calculate and derive residual signals that are used for generating bit-rate reduced data for the support signal 336.

According to one embodiment, the combiner processor 322 generates the support signal 336 by basing decisions to reduce bit rates in the upconverted video signal 338 on whether information in the upconverted video signal 338 that was reduced can be recovered or improved by the postprocessor at the decoder side to retain visual perception of image quality of the video data, instead of mere mathematical input-output comparisons of the video data.

A detailed discussion of operation of the combiner processor 322 is outside the scope of this document. In summary, however, in one embodiment, the combiner processor 322 may comprise a subtractor followed by a bit-rate reducer and processor, such as a non-linear quantization module that together generate the support signal 336 that is transmitted along with the information reduced video signal 332 to allow a postprocessor upon receipt to duplicate the original video signal 302.

In one embodiment, the subtractor generates a residual signal representing a difference between the video signal 302 and the upconverted video signal 334. The residual signal produced by the combiner processor 322 may include frequency differences due to the low pass filtering and large transitions between light and dark and/or loss of detail after filtering, particularly with any text appearing in the video.

In one embodiment, the bit-rate reducer receives the original video signal 302, the residual signal, and the upconverted video signal 334, and detects edges, busyness, and computer-generated information such as texts for selective reduction and processing of large edges, high busyness area, and/or other characteristics in video data to accommodate reduced bit-rate transmission of the video data without any or substantial visible degradation of image and video quality. The bit-rate reducer generates a bit-rate reduced signal that can be further processed by the non-linear quantization module.

In one embodiment, the nonlinear quantization module generates two or more bit-rate pathways and selects one of the bit-rate pathways providing a lowest bit-rate. The selected lowest bit-rate pathway comprises the support signal 336 output by the combiner processor 322 and may represent the result of additional bit rate reduction for cutting large edges and overly-busy areas, motion vector detection and compensation based on residual signals with addition of upconverted image signals, and a non-linear quantization that retains both computer-generated information such as texts and small high frequency details.

Most of the time the upconverted video signal 334 produced by the expander 320 is correct. From time to time, however, some events are not produced properly, such as repeat patterns, graphics, text, and certain texture details. But this should occur so rarely in practice that the bit count of the support signal 336 is very low, and mainly just adds whatever information is missing to the picture that many viewers may not even perceive. According to one embodiment, the bit rate of the support signal 336 is approximately 20% compared to information-reduced video signal 332.

For further details regarding operation of the combiner processor 322, see U.S. patent application Ser. No. 14/211,932, entitled "Combiner Processing System and Method for Support Layer Processing in a Bit-Rate Reduction System," filed on a date even herewith and incorporated herein by reference for all purposes.

In one embodiment, components of the preprocessor 300 may comprise one or more hardware components. In another embodiment, components of the preprocessor 300 may be implemented by one or more software components executing on one or more a programmable devices and/or other hardware devices, such as a graphics processor unit (GPU), a field programmable gate array (FPGA), a central processing unit (CPU), in conjunction with a memory device. In yet a further embodiment, components of the preprocessor 300 and comprise a combination of hardware and software components.

FIG. 3B is a diagram of another embodiment for a preprocessor that performs bidimensional video processing in the horizontal and vertical domains in serial along with diagonal interpolation. The embodiment of the preprocessor 300' is similar to the preprocessor 300 and FIG. 3A, but further includes the addition of a compressor 340 and a decompressor 342 coupled between the vertical pixel count detector 310' and the expander 320'.

The compressor 340 compresses the information-reduced video signal to generate a compressed information-reduced video signal 337, which is output as a main path, as well as input to the decompressor 342. The decompressor 342 decompresses the compressed information-reduced video signal 337 to generate a decompressed information-reduced video signal 339 that is input to the expander 320'.

It is known that the compression/decompression process may introduce errors into a video. According to one aspect of the exemplary embodiment, one purpose of using the compressor 340 and decompressor 342 is so that these errors may be included in the diagonal interpolation process and generation of the support signal 330' so that the support layer 330' may include information to correct these errors. In addition, motion vectors generated by the compression/decompression process may be used advantageously by the combiner processor 322' when generating the support signal 330'.

Figure 4:
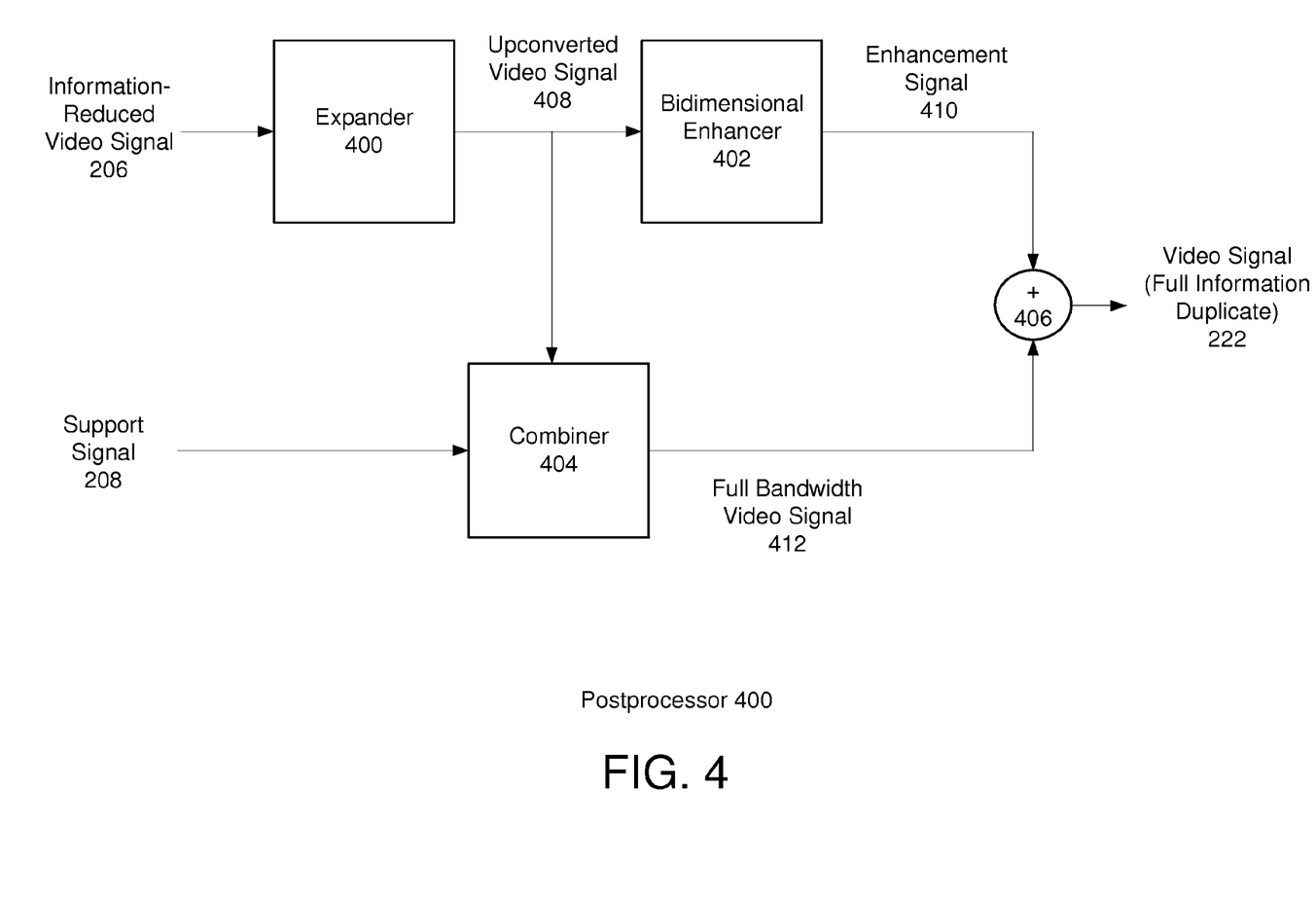
FIG. 4 is a block diagram illustrating one embodiment of a postprocessor 400 that performs bidimensional post processing.

FIG. 4 is a block diagram illustrating one embodiment of a postprocessor 400 that performs bidimensional post processing. According to this embodiment, postprocessor 400 may include an expander 400 (e.g., a diagonal interpolator), a bidimensional enhancer 402, a combiner 404, and an adder 406. The information-reduced video signal 206 and the support signal 208 from the encoder 216 or 216' shown in FIG. 1 are input to the diagonal interpolator 400 and the combiner 404, respectively.

Similar to the expander 320 in the preprocessor, the expander 400 enhances resolution of images represented in the information-reduced video signal 332. In one embodiment, the expander 400 comprises a diagonal interpolator that interpolates pixels that have been previously eliminated from the video signal 302 by blocks 304, 306, 308 and 310 of FIGS. 3A and 3B using an adaptive process that determines whether the interpolation should be done vertically or diagonally. The output of the diagonal interpolation 400 is an upconverted video signal 408 that is a simulated full bandwidth video signal of the original video signal.

The combiner 404 functions as an adder to combine the upconverted video signal 408 with the support signal 208 from the decoder 216 or 260' to generate a substantially full bandwidth video signal 412.

The bidimensional enhancer 402 is optionally used to compensate some deficiencies of the coder/transmission or storage/decoder path, such as a reduction in video bandwidth due to lossy compression systems. The enhancement process is conventional and well-known in the art, and corrects for some bandwidth deficiencies occurring ahead in the chain of video processing to deliver an image with a higher perceived sharpness. The output of the bidimensional enhancer 402 is an enhancement signal 410.

The adder 406 receives the full bandwidth video signal 412 and the enhancement signal 410 outputs a video signal 222 that is a full information duplicate, and therefore substantially identical, to the video input signal 302 of FIG. 1.

A method and system for bidimensional video processing has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable storage medium such as memory, a hard disk, or a CD/DVD-ROM and is to be executed by at least processor. The software could also be transmitted via a computer-readable transmission medium. Accordingly, many modifications may be made by one of ordinary skill in the art without departing from the spirit and scope of the appended claims.

We claim:

1. A method for bidimensional video processing, the method comprising:
    preprocessing the video signal in horizontal and vertical dimensions of the video signal to reduce an amount of information of the video signal by low pass filtering the video signal and removing pixels to obtain an information-reduced video signal;
    expanding the information-reduced video signal by an expander process to produce an upconverted video signal;
    comparing the upconverted video signal to the original video input to generate a support signal based on a difference between the original video signal and the upconverted video signal; and
    deciding to reduce bit rates in the upconverted video signal based on whether information in the upconverted video signal that was reduced can be recovered by a postprocessor to retain visual perception of image quality.

2. The method of claim 1, further comprising: at least one of storing and transmitting the information-reduced video signal and the support signal.

3. The method of claim 2, further comprising: during post-processing, expanding the information-reduced video signal by an expander process to produce an upconverted video signal, and combining the upconverted video signal and the support signal to generate a full information duplicate of the video signal.

4. The method of claim 3, wherein the post-processing is performed by a postprocessor, the post-processing further comprising:
    expanding the information-reduced video signal through diagonal interpolation to generate the upconverted video signal;
    enhancing the upconverted video signal to generate an enhancement signal;
    combining the upconverted video signal with the support signal to generate the full bandwidth video signal; and
    adding the enhancement signal and the full bandwidth video signal to generate a full information duplicate video signal.

5. The method of claim 1, wherein preprocessing the video signal further comprises: performing any combination of horizontal and vertical filtering on the video signal in series and in any order followed by any combination of horizontal and vertical pixel count reduction.

6. The method of claim 5, wherein the horizontal and vertical filtering comprises: horizontally low-pass filtering the video signal; and vertically low-pass filtering the video signal, respectively.

7. The method of claim 1, wherein expanding the information-reduced video signal further comprises: generating pixels previously eliminated from the video signal using an adaptive process.

8. The method of claim 7, wherein the expanding is performed through diagonal interpolation.

9. The method of claim 1, wherein a combiner processor decides whether to reduce the bit rates in the upconverted video signal, wherein the combiner processor comprises a subtractor, a bit-rate reducer, and a nonlinear quantization module, the method further comprising:
    generating, by the subtractor, a residual signal representing a difference between the video signal and the upconverted video signal, wherein the residual signal includes frequency differences due to low pass filtering and large transitions between light and dark and/or loss of detail after filtering;
    receiving, by the bit-rate reducer, the video signal, the residual signal, and the upconverted video signal, and detecting edges, busyness, and computer-generated information such as texts for selective reduction and processing of large edges, high busyness area, and/or other characteristics in video data to accommodate reduced bit-rate transmission of the video data without any or substantial visible degradation of image and video quality; and
    generating, by the nonlinear quantization module, two or more bit-rate pathways and selecting one of the bit-rate pathways providing a lowest bit-rate and outputting the lowest bit-rate pathway as the support signal.

10. The method of claim 1, further comprising a post-processing process comprising:
   using the information-reduced video signal to generate at least two corresponding simulated horizontal and vertical filtered components;
   combining the simulated horizontal and vertical filtered components with the corresponding horizontal support signal, the vertical support signal, and the temporal support signal to obtain estimated filtered components; and
   adding the estimated filtered components to the information-reduced video signal to generate a full information duplicate copy of the video signal.

11. A system for bidimensional video processing, comprising:
   a memory; and
   at least one preprocessor coupled to the memory configured to:
   preprocess the video signal in horizontal and vertical dimensions of the video signal to reduce an amount of information of the video signal by low pass filtering the video signal and removing pixels to obtain an information-reduced video signal;
   expand the information-reduced video signal by an expander process to produce an upconverted video signal;
   compare the upconverted video signal to the original video input to generate a support signal based on a difference between the original video signal and the upconverted video signal; and
   decide to reduce bit rates in the upconverted video signal based on whether information in the upconverted video signal that was reduced can be recovered by a postprocessor to retain visual perception of image quality.

12. The system of claim 11, further comprising: an encoder configured to at least one of store and transmit the information-reduced video signal and the support signal.

13. The system of claim 11, further comprising a postprocessor that receives and expands the information-reduced video signal by an expander to produce an upconverted video signal; and combines the upconverted video signal and the support signal to generate a full information duplicate of the video signal.

14. The method of claim 13, wherein the postprocessor is further configured to:
   expand the information-reduced video signal through diagonal interpolation to generate the upconverted video signal;
   enhance the upconverted video signal to generate an enhancement signal;
   combine the upconverted video signal with the support signal to generate the full bandwidth video signal; and
   adding the enhancement signal and the full bandwidth video signal to generate a full information duplicate video signal.

15. The system of claim 11, wherein the preprocessor performs any combination of horizontal and vertical filtering on the video signal in series and in any order followed by any combination of horizontal and vertical pixel count reduction.

16. The system of claim 15, wherein the horizontal and vertical filtering horizontally comprises low-pass filtering the video signal; and vertically low-pass filtering the video signal, respectively.

17. The system of claim 15, wherein the preprocessor expands the information-reduced video by generating pixels previously eliminated from the video signal using an adaptive process.

18. The method of claim 17, wherein the expanding is performed through diagonal interpolation.

19. The system of claim 11, wherein the preprocessor generates the support signal using a combiner processor that decides to reduce bit rates in the upconverted video signal, wherein the combiner processor comprises a subtractor, a bit-rate reducer, and a nonlinear quantization module, wherein:
   the subtractor generates a residual signal representing a difference between the video signal and the upconverted video signal, wherein the residual signal includes frequency differences due to low pass filtering and large transitions between light and dark and/or loss of detail after filtering;
   the bit-rate reducer receives the video signal, the residual signal, and the upconverted video signal, and detects edges, busyness, and computer-generated information such as texts for selective reduction and processing of large edges, high busyness area, and/or other characteristics in video data to accommodate reduced bit-rate transmission of the video data without any or substantial visible degradation of image and video quality; and
   the nonlinear quantization module generates two or more bit-rate pathways and selects one of the bit-rate pathways providing a lowest bit-rate and outputs the lowest bit-rate pathway as the support signal.

20. The system of claim 11, further comprising a postprocessor coupled to a decoder configured to:
   use the information-reduced video signal to generate at least two corresponding simulated horizontal and vertical filtered components;
   combine the simulated horizontal and vertical filtered components with the corresponding horizontal support signal, the vertical support signal, and the temporal support signal to obtain estimated filtered components; and
   Add the estimated filtered components to the information-reduced video signal to generate a full information duplicate copy of the video signal.

21. A method for bidimensional post-processing, comprising:
   receiving an information-reduced video signal and a support signal, the information-reduced video signal having been generated by a preprocessor that processed a video signal horizontal and vertical dimensions of the video signal to reduce an amount of information of the video signal by low pass filtering the video signal and removing pixels to obtain the information-reduced video signal; and
   expanding, by an expander, the information-reduced video signal to generate an upconverted video signal;
   enhancing, by a bidimensional enhancer, the upconverted video signal to generate an enhancement signal;
   combining, by a combiner processor, the upconverted video signal with the support signal to generate a full bandwidth video signal; and
   adding the enhancement signal in the full bandwidth video signal to generate a full information duplicate video signal.

* * * * *